United States Patent [19]

Murphy

[11] Patent Number: 4,459,333
[45] Date of Patent: Jul. 10, 1984

[54] LAMINATED PIPE INSULATION PRODUCT AND METHOD OF PRODUCING SAME

[76] Inventor: Hubert A. Murphy, 9th & Bridge Sts., Lehighton, Pa. 18235

[21] Appl. No.: 315,291

[22] Filed: Oct. 27, 1981

[51] Int. Cl.$^3$ ............................................. B32B 7/02
[52] U.S. Cl. ................................... 428/218; 264/113; 428/36; 138/149
[58] Field of Search ............... 264/112, 113; 156/62.8; 428/218, 36; 138/149

[56] References Cited

U.S. PATENT DOCUMENTS 4,201,247 5/1980 Shannon ............................ 264/113

FOREIGN PATENT DOCUMENTS 507476 6/1939 United Kingdom ................ 264/121

Primary Examiner—James R. Hall
Attorney, Agent, or Firm—John S. Roberts, Jr.

[57] ABSTRACT

A method of producing laminated or sandwich type pipe insulation comprising compressing and reducing an outer fiberglass layer together with one or more mineral wool layers, both originally containing a resin filler or adhesive. The adhesive is selected from phenol or urea-type resins and more specially from phenol formaldehyde and urea formaldehyde resins. Heat and pressure are utilized to manufacture the laminate and the thickness of the fiberglass is reduced to 1/10 to 1/20 of its original size during the manufacturing. A temperature of 100°–500° F. is utilized and an exopressure of 50–1,000 psi is used. Particular pipe insulations produced are the specialty ells (L's) and tees (T's) made by the above process.

7 Claims, 3 Drawing Figures

LAMINATED PIPE INSULATION PRODUCT AND METHOD OF PRODUCING SAME

This invention involves a novel process which in the form of a laminate or sandwich provides superior insulating properties to pipes. The pipe insulation, which is also known as pipe fitting covers, are more appropriately utilized in the shape of an ell (L) and also a tee (T) configuration. The size ranges of the L's can vary for pipes of about ½" pipe diameter up to and including 24" pipe diameter and the insulation thicknesses themselves are manufactured from ½" up to and including 6". The most preferred unit is one or more layers of mineral wool with an exterior shell of fiberglass and this has been termed Cadafit 1200.

Prior Art Statement

U.S. Pat. No. 4,201,247 Shannon shows a wide spectrum laminate which mentions, among other uses, pipe insulation.

DESCRIPTION OF THE DRAWINGS

Referring to FIGS. 1, 11 is compressed fiberglass and 12 is mineral wool. Both the glass fiber and mineral wool starting materials are available from Owens-Corning, Libby Owens Ford, Pittsburgh Plate Glass, and other glass manufacturing companies. The raw materials for the process and product of the present invention are well known; for example, see Kirk-Othmer, Encyclopedia of Chemical Technology, 2d Edition, Vol. 10, page 565, for fiberglass available in blanket form and impregnated or sized with a urea formaldehyde or phenol formaldehyde resin. Also the mineral wool raw material in blanket or matt cloth fabric form is commercially available; see Kirk-Othmer, Encyclopedia of Chemical Technology, 2d Edition, Vol. 11, page 829, which notes that pipe insulation is available either as preformed sections or as blankets suitable for wrapping. In the compression process via hydraulics press, the glass fiber is reduced to 1/10-1/20 its original depth, but the mineral wool retains largely its depth due to its shape and other factors. It has been calculated that on reduction, to add an inch of insulation to the pipe requires an additional inch of mineral wool, since the added depth of the glass fiber is almost de minimus in such calculations. Thus, in the figures, as shown in FIG. 1, the glass fiber product is shown as 11 and the mineral wool product is shown as 12.

The Materials

Figure 1:
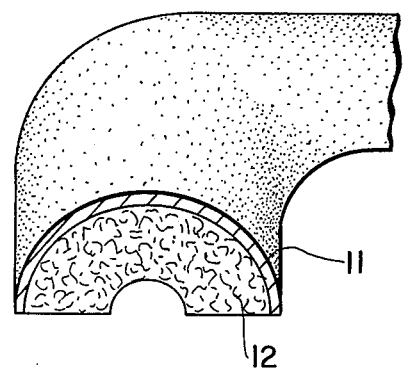
FIG. 1 shows the L-shaped pipe insulation product in side elevation.
Figure 2A:
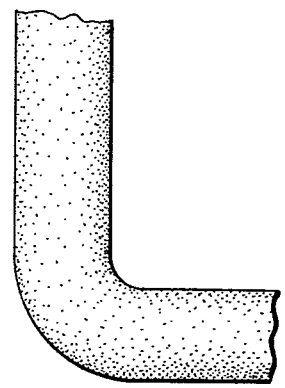
FIGS. 2A and 2B note the preferred shapes of L and T which can be utilized in the product in FIG. 1.
Figure 2B:
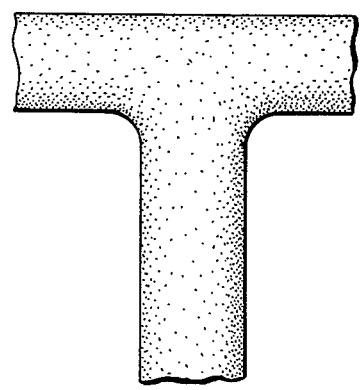

The adhesive for both the fiberglass and the mineral wool layers is an impregnate in the uncured blanket form of each type of insulation component. The resin as utilized is in a wet or liquid state and functions in a temperature range of 500°–1200° F. the surface temperature range of the pipe to be insulated. This resin is employed in the actual bonding of two totally dissimilar fibers. The arrangement of the layers is such that the material with a higher temperature limit, the mineral wool, is oriented to the inside layer where it will come into direct contact with the surface area of the pipe.

The fiberglass layer, the outside layer, permits the formation of specialty fittings, the ell and tee shapes. In addition, the fiberglass outer shell increases the tensile strength of the fitting, a problem in other insulation processes because mineral wool's short fibers are difficult to mold and hold together. The fiberglass is both pliant enough and strong enough to mold the mineral wool into ell and tee shapes of adequate tensile strenth. In this process, the outside layer of fiberglass is compressed from 1" layer thickness in its uncured state down to 1/16", in its cured state using a pressure range of 50 to 1000 psi. The fiberglass thus forms a shell around the mineral wool. This melding of the high density fiberglass shell to the underlying mineral wool fitting will control any possible air flow into the fitting which could support combustion. Furthermore, the superior density of the fiberglass exterior plus the high temperature insulation properties of the mineral wool provide a fitting with a superior degree of both tensile strength and insulation properties. This tensile strength is important because it allows the manufacture of the T and L shaped fittings of pipe insulation which peculiarly demand such amounts of tensile strength. In the case of a preformed ell, the larger the I.P.S. (interior pipe size) of the pipe to be insulated, the larger is the sweep of the arc, causing the exertion of greater tensile pressure on the comprising fibers of the pipe fitting cover.

Finally, in evaluating the possibilities of this insulation development as against methods that have been used in the past, it is noted that fiberglass has a higher thermal conductivity or K value than mineral wool or calcium silicate. The combining of mineral wool with glass fibers improves for present purposes the previous criticism of mineral wool for its poor load bearing qualifications. Thus, the present development, with the combination of glass fiber and mineral wool, makes use of the superior K value of both of these layers. The combination provides an enhanced K value compared to the industry standard.

The Molds

The molds of this invention are cast of heavy gauge galvanized aluminum. Because of the strength of these tools, their physical shape is not affected or altered by the constant stress of the extreme pressure and heat which is employed during production. With reference to the L-shaped fittings, the molds are used to manufacture several types of fittings according to the needs of the insulation industry; these are classified as weld type, socket weld, screwed ell, and copper tube ells. These are produced in 45° and 90° configurations.

The Juxtaposition of the Layers

The uncured mineral wool blanket provides some difficulties in curing because the mineral wool in some instances contains a concentration of shot or globules of minerals not fully processed into the finer fiberized form necessary for the molding process. It is noted that sizable concentrations of shot can deter proper production methods. In the present process, this is rectified by orienting the finer grade fiberglass without shot onto the outside perimeter of the mold and the fiberglass acts virtually as a cushioning agent against concentrations of shot in the mineral wool. Additionally, there is the problem of tensile strength which is more important in manufacturing tees and ells than in straight line production of pipe insulation. In other words, the problem is more pronounced in the molding of preformed ells or tees versus preformed straight run, the reason being that the shaping of a straight fiber into a curved configuration versus that of a straight configuration will subject that same straight fiber to a greater degree of tensile stress. In the case of a preformed ell, the larger the I.P.S. (interior pipe size) of the pipe to be insulated, the larger is the sweep of the arc and thus the greater is the tensile pressure exerted on the comprising fibers of the pipe fitting cover.

In this process, there is only one layer of fiberglass used without regard to the insulation thickness, the I.P.S. to be molded, or in contrast to the number or layers of mineral wool. The number of layers of mineral wool to be utilized is dependent on the ultimate insulation thickness to be achieved, as there is one layer of mineral wool blanket used for each inch of insulation thickness in the finished product. For example, a 2×2 inch 90-degree weld ell would utilize one layer of fiberglass and two layers of mineral wool as compared to an 8×4 inch, which would utilize the constant one layer of fiberglass and four layers of mineral wool.

As noted post, more definitively in Example 1, a pipe insulation sandwich is prepared utilizing the compression in an aluminum mold of an outside layer of glass fiber and an inside layer of mineral wool. Due to the density and the recently prepared mineral wool, the reduction achieved utilizing the impregnated resin in each formation occurs in the glass fiber layer, which is reduced from about 1" down to about 1/10-1/16". Temperature is utilized between 100°-500° F., depending on the cure time desired and pressure is utilized between 50-150 psi when air pressure is employed and 500-1,000 psi when hydraulics is employed. The female tool is heated to a lower temperature than the male tool and in a preferred embodiment, the female tool is heated to a temperature of about 250°-300° F. and the male tool is heated to a temperature of about 400°-500° F. The raw material is received in an uncured blanket form impregnated throughout with a wet resin. The blanket material is cut and placed into suitable molds, preferably aluminum molds or presses—the more dense mineral wool placed on top of the lighter weight fiberglass. In this way, the fiberglass is held to the outside perimeter in order to form the shell of the fitting cover. The mold or press consists of a female tool (upon which the uncured blankets of raw material are placed) and a male tool (used to form the inside structure of the fitting; i.e., shaping and curing the mineral wool). The press is then closed, thereby properly aligning the male and female tools. The temperature differential of the tools conforms to the curing properties of the respective materials—fiberglass cures faster than mineral wool, so the female tool is heated to a lower temperature than the male tool. Excessively heating the female tool will cause binder burnout resulting in a fuzzy or wrinkled fiberglass surface area.

The reduction of size of the fiberglass changes the density of this material to between 15-20 lbs/cu.ft. and it is in this manner that the bonding of the two dissimilar fibers is achieved without the use of an additional amount of adhesive. Adhesive in this case is a resin filler or adhesive for both layers and employs the phenol formaldehyde (Bakelite) or urea formaldehyde resins, which as stated are impregnated in both the mineral wool and the fiberglass. In utilizing this insulation, it has been found that the insulation is particularly adapted to ell-shape and tee-shape insulation and to the screening out of other previously known insulation products, such as expanded perlite. The exterior surface of fiberglass acts as a high density jacket that shuts out noise penetration from transmission lines and forces noise to dissipate on the inside of the wool. Additionally, the high density fiberglass jacket isolated air (oxygen) from the inner layers and thus does not support combustion that would cause punking. It is noted that the particular method of molding in two half sections enables application on fitting areas to be easier and faster than multiple mitered sections. A removable and replaceable cover is produced, one that can be removed for maintenance or inspection purposes and replaced once again.

EXAMPLE 1

In the preparation of a fiberglass exterior, mineral wool pipe insulation, the exterior shell was cut of a 1" thick one pound density layer of fiberglass. The interior of the fitting was cut from a single or multiple layer, depending on the insulation thickness of the fitting required, of 1" thick eight pound density mineral wool. One layer of mineral wool was required for each inch of insulation thickness demanded in the finished product. After this raw material was cut, both materials were simultaneously placed into a heavy gauge cast aluminum mold and cured under heat and pressure. Heat was employed directly related to the size and thickness of the finished product. The male and female part of the tooling can be heated from between 100°-500° F. depending on the cure time desired. The pressure exerted was between 50-150 psi when air pressure was employed but may use hydraulics between 500-1000 psi of pressure to obtain a much more durable and firm exterior surface. In this curing out or molding process, the very dense and brash mineral wool was placed on top of the light weight fiberglass in the mold; the fiberglass in turn was compressed from 1" thick down to 1/16 of an inch thick, thus changing the density to between 15-20 lbs./cu.ft. In this way the bonding of two dissimilar fibers was achieved without the use of an additional adhesive by employing the phenol formaldehyde or urea formaldehyde resins which were preimpregnated in both the mineral wool and the fiberglass.

EXAMPLE 2

Glass fiber in a layer form and mineral wool also in layer form were received in uncured blanket form impregnated with phenol formaldehyde resin. The layers or slabs of materials were protected from the adhesives so that the resin impregnation would not dry up under atmospheric conditions. The so-called blanket material was cut and placed into heavy aluminum molds with the brasher and more dense mineral wool placed on top of the lower lighter weight fiberglass. The ratio of thickness to material was maintained to effect a product which, after compression, would result in a 1/16" fiberglass shell on the outside and mineral wool on the inside. Heat (500° F. ) and pressure (800 psi) were introduced and the amounts of each regulated by two factors: the I.P.S. and the insulation thickness. The heat employed will cause the curing out of the binders contained within the fiberglass and mineral wool and permanently bond the two together. The pressure, obtainable only by the use of hydraulics, will compress the fiberglass layer from an uncured 1" thick to a cured 1/16" exterior shell. The molding produced both preformed fittings either ell- or tee-shaped.

EXAMPLE 3

In this process, there is only one layer of fiberglass used, regardless of insulation thickness or I.P.S. to be molded in contrast to a single or multiple layer of mineral wool. The number of layers of mineral wool to be utilized was dependent on the ultimate insulation thickness to be achieved, as there was one layer of mineral wool blanket used for each inch of insulation thickness in the finished product. For example, a 2×2 inch 90-degree weld ell would utilize one layer of fiberglass and two layers of mineral wool as compared to an 8×4 inch, which would utilize the constant one layer of fiberglass and four layers of mineral wool.

After the patterns were cut, the comprising layers of raw material were then placed one on top of the other in the exact sequence in which they were to be loaded into the press. The one layer of fiberglass which provides protection to 650 degrees F. was placed on the bottom, as this was held to the outside perimeter of the fitting cover to form the shell and the inner mineral wool layers only were then placed on top. The material was patted down and spread evenly around the inside of the mold to insure a uniform shape in the finished product.

The female tool was heated to 250°–300° F. This was in contrast to the male tool, which was heated to the higher temperature of 400°–500° F. The temperature of the female tool which was coming into direct contact with the fiberglass was held down to the lower temperature as the cure time on fiberglass impregnated by the previously described urea or phenolformaldehyde resin is quicker than that of the mineral wool. Fiberglass cures out at 10 minutes per one inch of blanket versus 15 minutes per one inch of blanket on the mineral wool. The temperature of the female tool must be carefully regulated because if this surface runs too hot, it will cause excessive burning out of the binder, which will result in a fuzzy or wrinkled surface area.

Some of the presses run on air pressure but the majority run with the use of hydraulic pressure. When air was employed, the pressure exerted was 50 lbs. per square inch. With the use of hydraulic power, the pressure was 1000 lbs. per square inch. It was possible to utilize air presses in the molding of fittings up to and including 3½" thick, but the air pressure was not really practical on anything over two inches thick as it was necesary to jack the press down to close it completely. In the production of fittings 3½" thick and over, hydraulic power was used. In short, air pressure is utilized with the smaller fittings (under 3½ inches) and hydraulic pressure is used to form the larger fittings (over 3½ inches thick).

I claim:
1. A method of producing pipe insulation in the shape of a T or L comprising:
 (a) joining an outer layer of fiberglass containing a resin to at least one inwardly disposed resin-impregnated mineral wool layer of said pipe insulation;
 (b) compressing and heating said outer layer of resin-impregnated fiberglass so as to reduce the thickness of the layer to 5–10% of its original size, said heating conducted at a temperature suitable to prevent burning or a fuzzy wrinkled surface on the fiberglass; and concurrently
 (c) curing said layers while heating the said mineral wool layer at a higher temperature than the said fiberglass layer;
and wherein additionally the heating and compressing of step (b) is carried out in a mold consisting of a T or L shaped female tool next to the fiberglass layer heated at 250°–300° F. and a similarly shaped male tool next to the mineral wool layer heated at a temperature of 400°–500° F.

2. The method according to claim 1 wherein the resin for said fiberglass containing layer and said mineral wool layer is selected from at least one adhesive from the group consisting of phenolic and urea resins.

3. The method according to claim 1 wherein said resin is selected from an adhesive from the group consisting of phenol formaldehyde and urea formaldehyde.

4. A pipe insulation product made according to the process of claim 1 wherein the product is in the shape of an L.

5. The product according to claim 4 wherein the product is in the shape of a T.

6. A product of pipe insulation produced by the method of claim 1 wherein the product is a pipe insulation in the shape of a T or L, has an exterior surface of fiberglass, acts as a jacket with a density of 15–20 lbs/cu.ft.

7. The method of claim 1 wherein about 250°–300° F. is used to heat the fiberglass layer and a pressure of 50–1000 p.s.i. is utilized in step (b) to compress the fiberglass layer from an uncured 1" thick to a cured 1/16" exterior layer thus changing the density result to between 15 and 20 lbs/cu.ft.

* * * * *